June 6, 1939.　　　　　G. T. COOKE　　　　　2,161,559
SPLIT BUSHING
Filed July 19, 1937
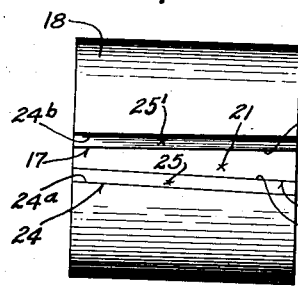
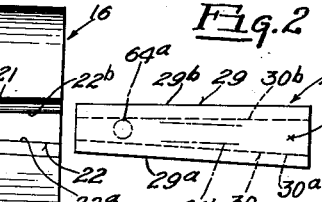
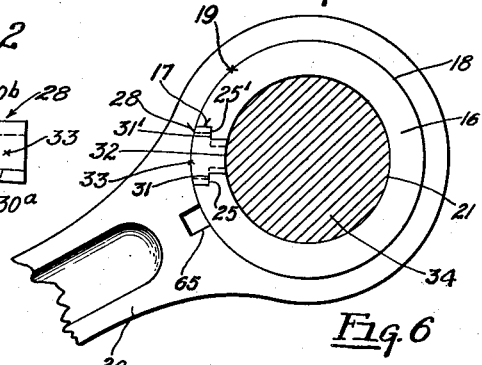
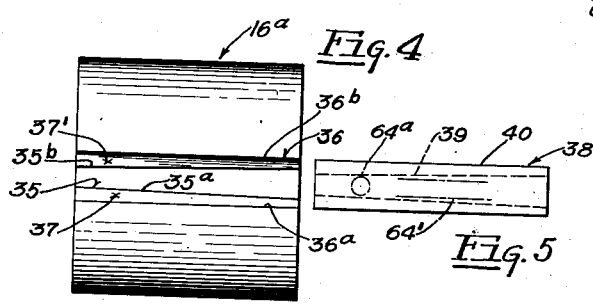
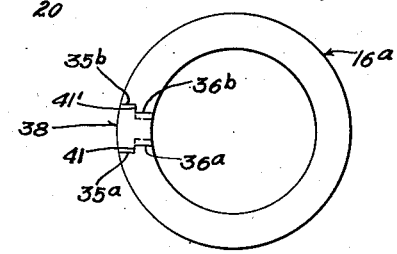
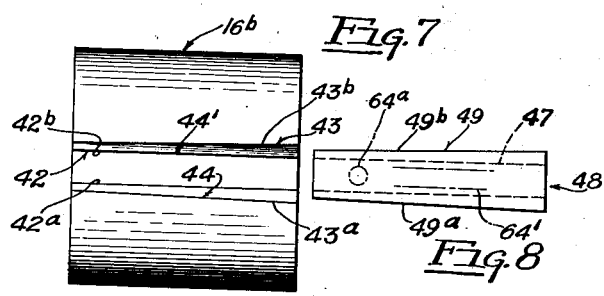
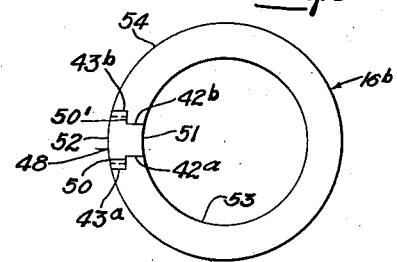
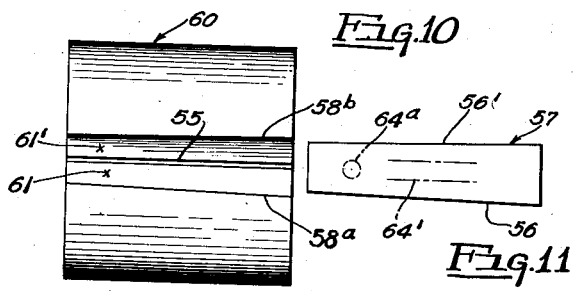
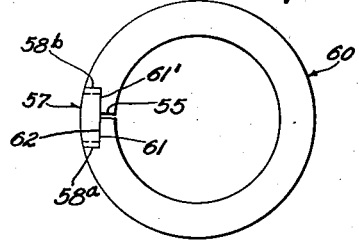
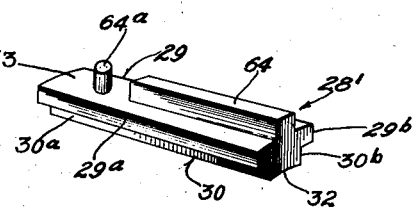
INVENTOR
GEORGE T. COOKE
BY William T. Veyrer
ATTORNEY Patented June 6, 1939

2,161,559

UNITED STATES PATENT OFFICE 2,161,559

SPLIT BUSHING

George T. Cooke, Norwalk, Conn., assignor to American Railway Products Co., Inc., Darien, Conn., a corporation of New York Application July 19, 1937, Serial No. 154,461

10 Claims. (Cl. 308—237)

The present invention relates to improvements in bearings, of which the following is a specification.

The most general practice at the present time is to form bearings by pressing solid bushings into any suitable bearing housing. In such applications it is highly important to have the bore or hole of the bearing housing very accurately machined in order to minimize difficulty in applying and maintaining the bushing therein. If such a usual solid bushing is loose when applied or becomes loose in the housing damage may result and it is customarily necessary to replace the entire bushing. Also, if there is a very tight fit much pressure is required and difficulty is encountered in removing the bushing.

Therefore, it is an important object of the present invention to provide a bushing which may be: (1) initially set in place easily and without marring or distorting the bushing, even though there are slight variations in the size of the bore receiving the same; (2) easily and effectively locked in place; (3) expanded and locked in place easily if it becomes loosened; and, (4) removed with ease for replacement or repair.

Features resulting from the attainment of these objectives include the provision of a split bushing which may be contracted or expanded and which has a special form of opening key member to expand and lock the split bushing in place. In some forms the key member provides a contiguous bearing surface in the split bushing. Of particular importance the key and bushing are so constructed that the key is positively located relative to the axis, or to the inner and outer peripheral surfaces of the split bushing. A complemental feature is the provision of a spline on the above-mentioned key adapted to locate the split bushing and to prevent it from turning in the housing or bore to which it is applied.

Other objects, features and advantages will appear hereinafter.

In the drawing:

Figure 1 is a side view of the preferred form of split bushing provided by the present invention.

Fig. 2 is a detail view of the form of key used with the split bushing of Fig. 1.

Fig. 3 is an end view of the split bushing and key shown in Figs. 1 and 2 in an assembled condition.

Fig. 4 is a side view of a modified form of split bushing, similar to Fig. 1, but showing a straight and a tapered slot lengthwise of the bushing.

Fig. 5 is a detail of the key used with that form of the invention shown in Fig. 4.

Fig. 6 is an end view of the assembled split bushing and key shown in Figs. 4 and 5.

Fig. 7 is a plan view of a modified form of split bushing similar to that shown in Figs. 1 and 4.

Fig. 8 is a detail of the key used with that form of split bushing shown in Fig. 7.

Fig. 9 is an end view of the split bushing and key shown in Figs. 7 and 8, in assembled condition.

Fig. 10 is a side view of a modified split bushing, closest to that form shown in Figs. 1 and 7.

Fig. 11 is a detail view of the key used with that form of bushing shown in Fig. 10.

Fig. 12 is an assembly view of the split bushing and key shown in Figs. 10 and 11.

Fig. 13 is a detail view of a modified form of key.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring now in detail to the drawing, and first to that form shown in Figs. 1, 2 and 3, the present invention includes a split bushing 16 with the main body thereof having a split or main slot 17 extending lengthwise thereof. The bushing includes an outer or gripping surface 18, which may be of round, hexagon or any other suitable and usual external shape adapted to fit into a cooperating bore 19 in any kind of a machine or the like. For the purpose of illustration the split bushing is shown in Fig. 3 as placed in the bore 19 at the end of a connecting rod 20. The bushing also includes an inner surface 21, constituting the main bearing surface of the bushing.

The inner and outer surfaces 21 and 18 respectively may be turned, ground, broached or otherwise machined or shaped, as preferred. Preferably, however, the main body of the bushing is made of strip stock of the desired wall thickness and merely curled from the flat into the circular shape shown, in any now well-known manner. It may be then machined, ground and/or otherwise finished on the inside and/or outside surfaces.

Of particular importance the main slot 17 is of stepped form including a tapered inner slot 22 with walls 22a and 22b converging lengthwise of the split bushing 16. The bushing further includes a wide tapered slot 24 with walls 24a and 24b converging lengthwise of the bushing in substantially the same degree and direction as the walls 22a and 22b converge. A pair of shelves 25 and 25' define the inner slot 22 from the outer slot 24 and serve an important locating function, fully described hereinafter. The split bushing, when in the normal condition shown in Fig. 1, may be easily inserted into any machine part, such, for example, as the connecting rod 20 shown in Fig. 3. Because the split or main slot 17 permits, it may be contracted very easily if the bore is close-fit or if there happens to be an exceedingly snug fit.

Expansion of the bushing 16 in the bore 19 with which it is associated, to lock the same in place and prevent it from turning, is effected by a novel key 28, best seen in Figs. 2 and 3, having a wide outer wedge 29, having converging outer walls 29a and 29b and a narrow inner wedge 30 defined by walls 30a and 30b, the two wedges 29 and 30 being divided by bases 31 and 31' adapted to rest on the shelves 25 and 25', respectively.

From the foregoing it will be apparent that the key 28 and main slot 17 are so formed that the wide and narrow wedges 29 and 30 respectively entering the wide and narrow slots 24 and 22 respectively serve to expand the bushing 16 and lock it in place while the bases 31 and 31' resting upon the shelves 25 and 25' serve to positively locate the key 28 relative to the axis of the bushing so that inner and outer faces 32 and 33 on the key will be coextensive with the inner and outer surfaces 21 and 18 of the split bushing 16.

The inner face 32 is preferably coextensive with the inner surface 21 of the split bushing 16 to fully close the main slot 17 and to preferably provide a contiguous and full bearing surface around the entire inner periphery of the bushing for a crank shaft 34, or any other instrumentality therein. The outer face 33 of the key 28 pushes the inner face 32 toward registry with the inner surface 21 of the split bushing 16 while the shelves 25 and 25' engaging the bases 31 and 31' locate the inner face in absolute alignment therewith. The outer face also serves to prevent the key 28 from moving outwardly away from the shelves 25 and 25' of the main slot 17.

To apply the bushing of the present invention it is merely necessary to place a split bushing 16 into the place where it is intended to be used and merely tap the key 28 slightly in order to firmly wedge the entire bushing in place in the bore 19 or the like. Removal of the bushing is easily effected by merely tapping the key upon the narrower cross-sectional end thereof. Once the strong wedging action is broken the key and the bushing may be easily removed.

The key 28 may be of exactly the same length as the bushing 16; may be shorter with respect to both ends of the bushing after the wedge is driven home to expand the bushing so that there will be no surplusage at the ends; or, may be of slightly greater length than the bushing in order to provide a slight surplusage which may be readily cut off in any desired manner to remove hammer marks and the like.

That form of the invention shown in Figs. 4, 5 and 6 is like that form of the invention shown in Figs. 1, 2 and 3, and just described in detail. It has all the advantages of the first form described, differing therefrom primarily in the provision of a split bushing 16a having only one tapered slot 35, the inner one, with converging walls 35a and 35b and an outer locator slot 36 with parallel walls 36a and 36b defined by shelves 37 and 37' therebetween, adapted to receive a key 38 with an inner tapered wedge 39 and a straight locator section 40 having bases 41 and 41' therebetween.

Thus, it is apparent that the main difference of this form over the first form is the provision of a straight outer slot and cooperating straight locator section, comparable to the tapered or lengthwise converging outer slot. The main advantage of this form is that it is slightly more economical to manufacture and that the split bushing may be made from strip material with the ends thereof chopped to a length at a slight angle to form the tapered walls 35a and 35b while the outer slot is formed preferably by a straight and simple milling cut. Thus, it is apparent that no angular milling or grinding operations are required subsequent to pressing or forming the split bushing.

That form of the invention disclosed in Figs. 7, 8 and 9 is similar to the two forms of invention just described, and particularly it is closest to that form shown in Figs. 4, 5 and 6. It differs from the latter form primarily in the provision of a split bushing 16b having a straight inner slot 42 including straight walls 42a and 42b and a tapering outer slot 43 with lengthwise converging walls 43a and 43b, having shelves 44 and 44' separating the two; whereas, in the last preceding form described the inner slot is tapering and the outer slot is straight.

With this form of the invention a key 48 is provided having a straight inner section 47 serving primarily to close the slot in the split bushing and to provide a substantially full bearing surface on the interior thereof. Also, the key includes a wide outer wedge section 49 having side walls 49a and 49b engaging with the side walls 43a and 43b to expand and lock the bushing in any suitable bore. Bases 50 and 50' thereon engage with shelves 44 and 44' to locate the key relative to the axis of the split bushing 16b, and particularly to locate inner and outer faces 51 and 52 relative to the inner and outer peripheral surfaces 53 and 54 respectively of the split bushing.

That form of the invention shown in Figs. 10, 11 and 12 is closest to that form shown in Figs. 7, 8 and 9, differing primarily in the provision of a very narrow straight inner slot 55 and the omission of a straight inner section on the key. This form of the invention may be understood best by viewing Figs. 11 and 12. Converging walls 56 and 56' on a key 57 engaging converging walls 58a and 58b on a split bushing 60 serve to expand and lock the latter in any suitable bore. Shelves 61 and 61' engaging a bottom face 62 on the key serve to locate the latter relative to the axis of the split bushing 60.

Because the wall of the slots in the various split bushings are parallel to each other as they extend toward the axis the circumferential relation of the various keys relative to their associated split bushings remains the same and there is no danger of changing the bushings from a concentric to an eccentric shape.

If preferred the key 28 may be provided with a spline 64 (see Fig. 13), preferably made integral therewith, adapted to enter any suitable keyway such as the keyway 65 in the connecting rod 20 of Fig. 3 to absolutely prevent the split bushing from rotating in the bore 19.

When this form of construction is provided it is preferable to have the key 28' and split bushing 16 align with the key slot 65 when a person starts to assemble the bushing. As shown by dot-and-dash lines 64' the spline and slot connection just described in detail may be provided and used with each of the forms of the invention disclosed herein. Also, if preferred, the spline may be in the form of a simple short pin 64a screwed or forced into any of the keys 28, 38, 48 or 57 as shown on the latter key in Fig. 11; or, as more completely shown in Fig. 13.

Other variations and modifications may be made within the scope of this invention and portions of the improvements may be used without others.

I claim:

1. A bearing for lining the bore of an article comprising a split bushing having a wide and a narrow slot extending axially thereof, both of said slots converging lengthwise of the bushing; and a tapered key fitting into both of said converging slots for expanding the split bushing in the bore.

2. A bearing for lining the bore of an article comprising a split bushing having a wide and a narrow slot extending axially thereof, both of said slots converging lengthwise of the bushing; a tapered key fitting into both of said converging slots for expanding the split bushing in the bore; and means on said bushing between said wide and narrow slots and upon said tapered key, for positively maintaining and locating said key relative to the axis of the bushing and to the bore.

3. A bearing for lining the bores of an article comprising a split bushing with inner and outer peripheral surfaces, and having a wide and a narrow slot, at least one of said slots converging lengthwise of the bushing; a tapered key fitting into the said slots for expanding the latter in the bore, said key having inner and outer faces substantially coextensive with the inner and outer peripheral surfaces of the split bushing; and means on said split bushing and tapered key for locating and maintaining inner and outer faces of the key in registry with the inner and outer surfaces of the split bushing.

4. A bearing for lining the bore of an article having a key slot, comprising a split bushing having a merging wide and a narrow slot extending lengthwise of the bushing; a key fitting into said wide and narrow slots to substantially fill the same; and a spline structure on said key fitting into said key slot in the bore of the article, to locate the bushing circumferentially and to prevent it from turning therein.

5. A bearing for lining the bore of an article having a key slot, comprising a split bushing having a wide and a narrow slot extending lengthwise of the bushing, at least one of said slots converging lengthwise of the bushing; a tapering key fitting into at least one of said slots for expanding said bushing; and a spline structure on said key fitting into said key slot in the bore of the article, to locate the bushing circumferentially and to prevent it from turning therein.

6. A bearing for lining the bore of an article having a key slot, comprising a split bushing having associated wide and narrow slots both of which converge lengthwise of the bushing, said bushing having inner and outer surfaces; a double tapering key fitting into both of said converging slots; means between said wide and narrow slots and on said key for locating the key relative to said inner and outer surfaces; and a spline structure on said key fitting into said key slot in the bore of the article, to locate the bushing circumferentially and to prevent it from turning therein.

7. A bearing for lining the bore of an article having a key slot, comprising a split bushing having associated wide and narrow slots extending lengthwise of the bushing and having inner and outer surfaces; a key fitting into said wide and narrow slots to substantially fill the same; means between said wide and narrow slots and on said key for locating the key relative to said inner and outer surfaces; and a spline structure on said key fitting into said key slot in the bore of the article, to locate the bushing circumferentially and to prevent it from turning therein.

8. A bearing for lining the wall of a bore of an article including a split bushing having a substantially T-shaped slot extending lengthwise of the bushing and comprising two portions; and a T-shaped key fitting into said portions and confined therein so as to engage the walls of both portions, the outer face of said key engaging the wall of said bore.

9. A bearing for lining the wall of a bore of an article including a split bushing having a slot substantially T-shaped in cross section and comprising two portions; at least one of said portions converging uniformly throughout the length of the bushing and a tapered key confined wholly within said slot and fitting into both said portions thereof for expanding the split bushing in the bore, the outer face of said key engaging the wall of said bore.

10. A bearing for lining the wall of a bore of an article comprising a split bushing for accommodating an operating member and having a wide and a narrow slot, one of said slots converging from end to end of the bushing; a shelf between the wide and narrow slots; and a key of uniform thickness and uniformly tapered width substantially throughout its length for fitting into said converging slot, said key being within the periphery of said bushing and extending substantially from end to end thereof for expanding said bushing in the bore and engaging said shelf to maintain said key in position relative to said operating member and the wall of said bore.

GEORGE T. COOKE.